(12) United States Patent
Culwick (10) Patent No.: US 11,408,348 B2
(45) Date of Patent: Aug. 9, 2022

(54) FUEL SUPPLY SYSTEM

(71) Applicant: ROLLS-ROYCE plc, London (GB)

(72) Inventor: Steven P. Culwick, Derby (GB)

(73) Assignee: Rolls-Royce PLC, London (GB)

( * ) Notice: Subject to any disclaimer, the term of this patent is extended or adjusted under 35 U.S.C. 154(b) by 10 days.

(21) Appl. No.: 17/186,714

(22) Filed: Feb. 26, 2021

(65) Prior Publication Data
US 2021/0277834 A1 Sep. 9, 2021

(30) Foreign Application Priority Data

Mar. 9, 2020 (GB) ..................................... 2003369

(51) Int. Cl.
| | |
|---|---|
| F02C 7/228 | (2006.01) |
| F02C 7/22 | (2006.01) |
| F02C 7/232 | (2006.01) |
| F02C 9/26 | (2006.01) |
| F23R 3/34 | (2006.01) |
| F02C 9/36 | (2006.01) |

(52) U.S. Cl.
CPC ............... *F02C 7/228* (2013.01); *F02C 7/22* (2013.01); *F02C 7/222* (2013.01); *F02C 7/232* (2013.01); *F02C 9/263* (2013.01); *F23R 3/343* (2013.01); *F23R 3/346* (2013.01); *F02C 9/36* (2013.01)

(58) Field of Classification Search
CPC .................................. F02C 7/228; F02C 9/36
See application file for complete search history.

(56) References Cited

U.S. PATENT DOCUMENTS

| | | | |
|---|---|---|---|
| 5,809,771 A | 9/1998 | Wernberg | |
| 2017/0298839 A1* | 10/2017 | Hill | ........................... F02C 9/46 |
| 2018/0163630 A1* | 6/2018 | Bickley | ..................... F23K 5/06 |

FOREIGN PATENT DOCUMENTS

| | | |
|---|---|---|
| EP | 2339147 A2 | 6/2011 |
| EP | 2469057 A1 | 6/2012 |
| EP | 2762711 A2 | 8/2014 |
| EP | 3211200 A1 | 8/2017 |
| EP | 3217000 A1 | 9/2017 |

(Continued)

OTHER PUBLICATIONS

European search report dated Jun. 29, 2021, issued in EP patent application No. 21155663.

(Continued)

*Primary Examiner* — Katheryn A Malatek
*Assistant Examiner* — Alyson Joan Harrington (57) ABSTRACT

A fuel supply system for fuel injectors of a multi-stage combustor of a gas turbine engine is provided. The system has a metering and splitting arrangement which receives a pressurised fuel flow and controllably meters and splits the received flow into metered pilot and mains flows for injecting respectively at pilot and mains fuel discharge orifices of the injectors to perform staging control of the combustor. The system further has pilot and mains fuel distribution pipeworks respectively distributing fuel from the metering and splitting arrangement to the pilot and mains discharge orifices. The system further has a controller which is configured to command the metering and splitting arrangement to provide the metered flows, to select the pilot distribution pipework and deselect the mains distribution pipework for pilot-only operation.

12 Claims, 6 Drawing Sheets

(56) References Cited

FOREIGN PATENT DOCUMENTS

| | | |
|---|---|---|
| EP | 3070408 B1 | 6/2018 |
| EP | 3061949 B1 | 2/2020 |
| GB | 2557601 B | 1/2019 |
| GB | 2557599 B | 5/2019 |
| GB | 2557603 B | 1/2020 |
| GB | 2557603 B1 | 2/2020 |

OTHER PUBLICATIONS

Great Britain search report dated Aug. 25, 2020, issued in GB Patent Application No. 21155663.4.

* cited by examiner

FUEL SUPPLY SYSTEM

CROSS-REFERENCE TO RELATED APPLICATIONS

This specification is based upon and claims the benefit of priority from UK Patent Application Number 2003369.2 filed on Mar. 9, 2020, the entire contents of which are incorporated herein by reference.

BACKGROUND

Technical Field

The present invention relates to a fuel supply system for fuel injectors of a multi-stage combustor of a gas turbine engine.

Description of the Related Art

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stages are activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Multi-stage combustors may have further stages and/or manifolds. For example, the pilot manifold may be split into two manifolds for lean blow-out prevention.

When the mains stages are taken out of use, shutoff valves can be used to prevent fuel in the mains manifold from going downstream and entering the combustion chamber through the mains orifices of the fuel nozzles.

For example, within the injectors, shutoff valves, known as a fuel flow scheduling valves (FSVs), may be associated with the feeds in order to prevent combustion chamber gases entering the fuel system. The FSVs also prevent fuel flow into the fuel nozzles when the supply pressure is less than the cracking pressure. EP A 3061949 describes such a combustion staging system in which each injector has a shutoff valve to control the flow of fuel from the mains manifold through the injector and into the combustion chamber. During pilot-only operation fuel in the volume between each shutoff valve and the combustion chamber tends to drain into the combustion chamber, while the mains fuel behind the valve is located close to the combustor so picks up heat. Thus a separate recirculation manifold is used to keep the fuel in the mains manifold cool when it is deselected. It does this by keeping the fuel moving through the mains manifold, although a cooling flow also has to be maintained in the recirculation manifold during mains operation to avoid coking.

GB A 2557601 and GB A 2557599 describe alternative systems in which mains shutoff valves are located further away from the injectors, leaving a larger volume between the valves and the injectors. The valves are able to drain ("de-prime") the volume when the valves close for de-staging and fill ("re-prime") the volume when the valves open for re-staging. In this way, during pilot-only operation, mains fuel is not contained within the volume, avoiding the need for a cooling loop.

When the mains stages are brought back into use, some of the fuel flow sent to each injector is used to fill the volume between the shutoff valves and the combustion chamber, rather than burnt in the engine. From the perspective of the engine, this causes fuel dips during staging as fuel is diverted in to filling the drained volumes.

Such fuel dip can occur during engine transients, affecting acceleration times and penalising compressor surge margins by changing the engine matching during phases where surge margins are naturally at a minimum. A known mitigation for this problem is to open loop meter additional fuel to compensate for the expected dip.

However, the manner in which fuel drains from a volume is difficult to predict: there seems to be dependency on the length of time the volume is depressurised as well as the pressure in the combustion chamber, which changes over time, but it is not well understood. Therefore the amount of fuel that has drained, and therefore needs to be added to fill the volume, may not be known. Accordingly, the additional fuel may be added for longer than necessary—leading to a fuel spike when the drained volumes are filled.

Thus the uncertainty in draining means that drained volumes and priming flows are conventionally kept relatively small in order to ensure that priming can occur without causing large fuel dips, and to avoid excessive spikes if the drained volume is smaller than expected and the priming flow is seen by the engine. The reduction of drained volumes leads to adoption of systems having burner head mounted shutoff valves, such as described in EP A 3061949, and the associated complication of a cooling loop to manage the heat pickup in the continuously primed manifold supplying the burner head valves.

In addition, as the fuel dip/spike associated with staging cannot be tightly controlled, engine acceleration/deceleration profiles have to be managed to ensure sufficient surge margin at these points. Conversely, if greater control could be exerted over the priming flow, there would be less need to adopt conservative acceleration/deceleration profiles during staging and therefore improved acceleration/deceleration times.

SUMMARY

It would be desirable to provide a combustion staging system which enables better control of priming flows such that the fuel dip/spike associated with staging can be reduced or eliminated.

According to a first aspect there is provided a fuel supply system for fuel injectors of a multi-stage combustor of a gas turbine engine, the system having:

a metering and splitting arrangement which receives a pressurised fuel flow and controllably meters and splits the received flow into metered pilot and mains flows for injecting respectively at pilot and mains fuel discharge orifices of the injectors to perform staging control of the combustor;

pilot and mains fuel distribution pipeworks respectively distributing fuel from the metering and splitting arrangement to the pilot and mains discharge orifices; and a controller which is configured to command the metering and splitting arrangement to provide the metered flows, to select the pilot distribution pipework and deselect the mains distribution pipework for pilot-only operation in which there is a pilot flow to the combustor but no mains flow to the combustor from the injectors, and to select both the pilot and mains distribution pipeworks for pilot and mains operation in which there are pilot and mains flows to the combustor from the injectors;

wherein:

the system further has a pressure sensor configured to detect pressure and provide the detected pressure to the controller;

the system further has priming means for providing a priming flow to the mains distribution pipework; and the controller is further configured to command the priming means to provide the priming flow to the mains distribution pipework when pilot and mains operation is initiated in order to refill, preliminary to providing the mains flow, a volume of the mains distribution pipework adjacent the mains discharge orifices from which fuel drains when the mains distribution pipework is deselected for pilot-only operation, and to command the priming means to stop the priming flow when the detected pressure is indicative of a pressure rise caused by combustion of the priming flow.

The commands provided to the priming means can thus perform closed loop control of the priming flow. As long as the duration of the pressure spike caused by the combustion of the priming flow is short, any effect on compressor stability is insignificant. Advantageously, the system enables a reduction in the worst case fuel spike that has to be assumed by reducing the amount of over-fuelling that can occur during priming. This can be traded for an increase in priming boost and therefore reduced fuel dips.

In a second aspect, the present invention provides a gas turbine engine having a multi-stage combustor and the fuel supply system according to the first aspect for supplying fuel to and performing staging control in respect of pilot and mains fuel discharge orifices of fuel injectors of the combustor.

Optional features of the invention will now be set out.

The fuel supply system may further have a pumping system to supply the fuel flow to the metering and splitting arrangement. The pumping system may have a low pressure pumping stage and high pressure pumping stage arranged in flow series. The low pressure pumping stage can be a centrifugal pump, and the high pressure pumping stage can be a positive displacement pump (e.g. one more gear pumps).

The pilot fuel distribution pipework may include a pilot fuel manifold distributing fuel from the metering and splitting arrangement to the pilot discharge orifices. The pilot manifold may include a segment restrictable by a lean blow out protection valve to decrease the proportion of the pilot fuel flow delivered to the injectors fed by the segment relative to the total pilot fuel flow delivered to the remaining injectors of the combustor.

The controller can be an element of an engine electronic controller (EEC).

The pressure rise and subsequent stopping of the priming flow produces a pressure spike, the pressure sensor, the priming means and the controller preferably being configured to stop the priming flow such that the spike has a duration of no more than 15 ms.

The controller may be configured to command the pressure sensor to increase a frequency of pressure detection by the pressure sensor when pilot and mains operation is initiated and the priming flow is provided. Thus the frequency of measurement can be adapted to the immediate control needs.

The fuel supply system may further include one or more mains isolation valves, the mains fuel distribution pipework having fuel lines which extend from the one or more isolation valves to the mains fuel discharge orifices. The one or more isolation valves may have a closed position in which, when the mains distribution pipework is deselected for pilot-only operation, they remove the mains fuel from the injectors through the fuel lines to form the drained volume and fluidly isolate the fuel lines from the metering and splitting arrangement. The one or more isolation valves may further have an open position in which, when the mains distribution pipework is selected for pilot and mains operation, they fill the drained volume with the priming flow and reconnect the fuel lines to the metering and splitting arrangement. The isolation valves may be supplemented by one or more pumps to assist with the draining of mains fuel.

The metering and splitting arrangement may include a fuel metering valve operable to meter the received flow, and a splitting unit which controllably splits the metered flow from the fuel metering valve and sends respective portions of the metered flow to the pilot and mains fuel distribution pipeworks to perform staging control of the combustor.

The metering and splitting arrangement may be the priming means.

For example, when the metering and splitting arrangement includes a fuel metering valve, the controller can be configured to command the fuel metering valve to apply a priming bias which increases the total flow from the fuel metering valve relative to the subsequent combined pilot and mains flows from the fuel metering valve, the controller removing the bias to stop the priming flow. The splitting unit can then direct the increased flow to the mains fuel distribution pipework.

As another example, the metering and splitting arrangement may further include a pressure drop control arrangement operable to regulate a pressure drop across the metering valve, wherein the pressure drop control arrangement maintains in normal use a substantially constant pressure drop across the metering valve, and, to form the priming flow, the controller is configured to command an increase in the pressure drop across the metering valve to increase the metered flow therefrom. Again the splitting unit can then direct the increased flow to the mains fuel distribution pipework. Advantageously, this example can be faster-acting than the previous example because the pressure control loop generally has a significantly faster dynamics than the fuel metering valve. The pressure drop control arrangement may comprise a pressure drop control valve and a spill valve. The fuel supply system may further have an electromagnetically operated servo valve which is controllable by the controller to operate the pressure drop control arrangement and thereby regulate the pressure drop across the metering valve. Such a valve can be fast-acting and conveniently may be implemented as extended functionality of a thrust control malfunction accommodation valve.

Another option, however, is for fuel supply system to further have a bypass line which bypasses the metering and splitting arrangement, and an augmentation valve which is operable by the controller to open or close the bypass line, wherein the bypass line and the augmentation valve are the priming means, and to form the priming flow, the controller commands the augmentation valve to open, thereby sending a portion of the pressurised fuel flow to the mains fuel distribution pipework through the bypass line. Such an arrangement can also be fast-acting.

Faster-acting priming means enable the adoption of higher priming flows and therefore greater drained volumes. This allows, for example, the above-mentioned isolation valves to be moved further upstream from the injectors, which in turn allows the number of isolation valves to be reduced (potentially to one), with associated cost and weight reductions. Moreover, if the isolation valves can be moved back to a zone where stagnant fuel can be held without suffering excessive thermal degradation, this allows the removal of heat management valves and cooling loops, of the type described in EP A 3061949.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DESCRIPTION OF THE DRAWINGS

Aspects and embodiments of the present disclosure will now be discussed with reference to the accompanying figures. Further aspects and embodiments will be apparent to those skilled in the art.

Figure 1:
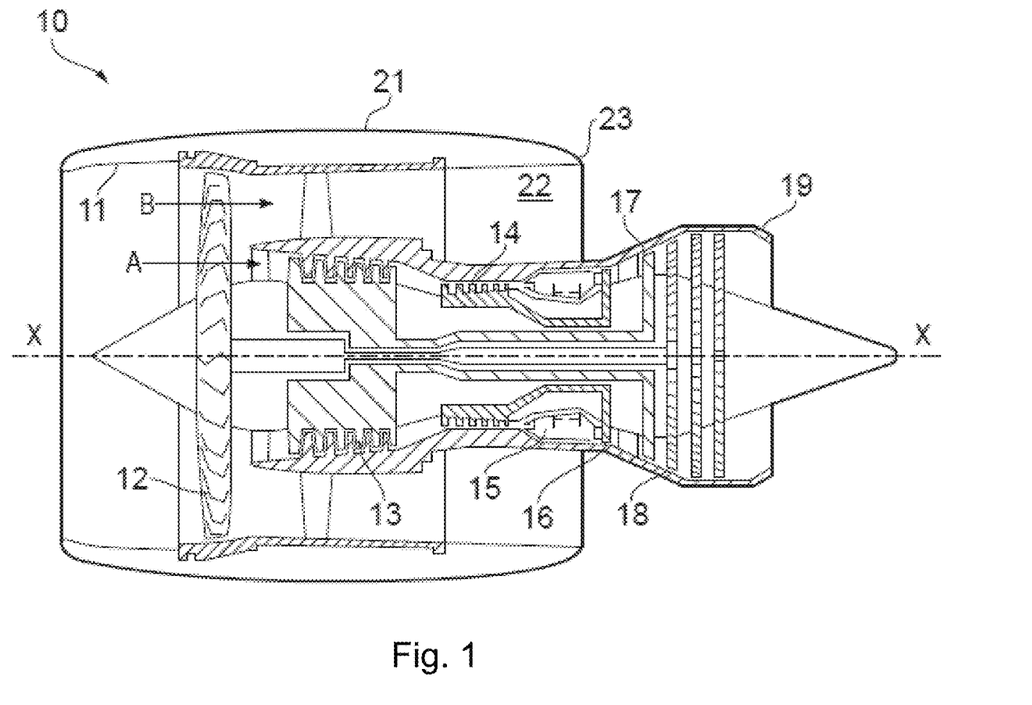
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
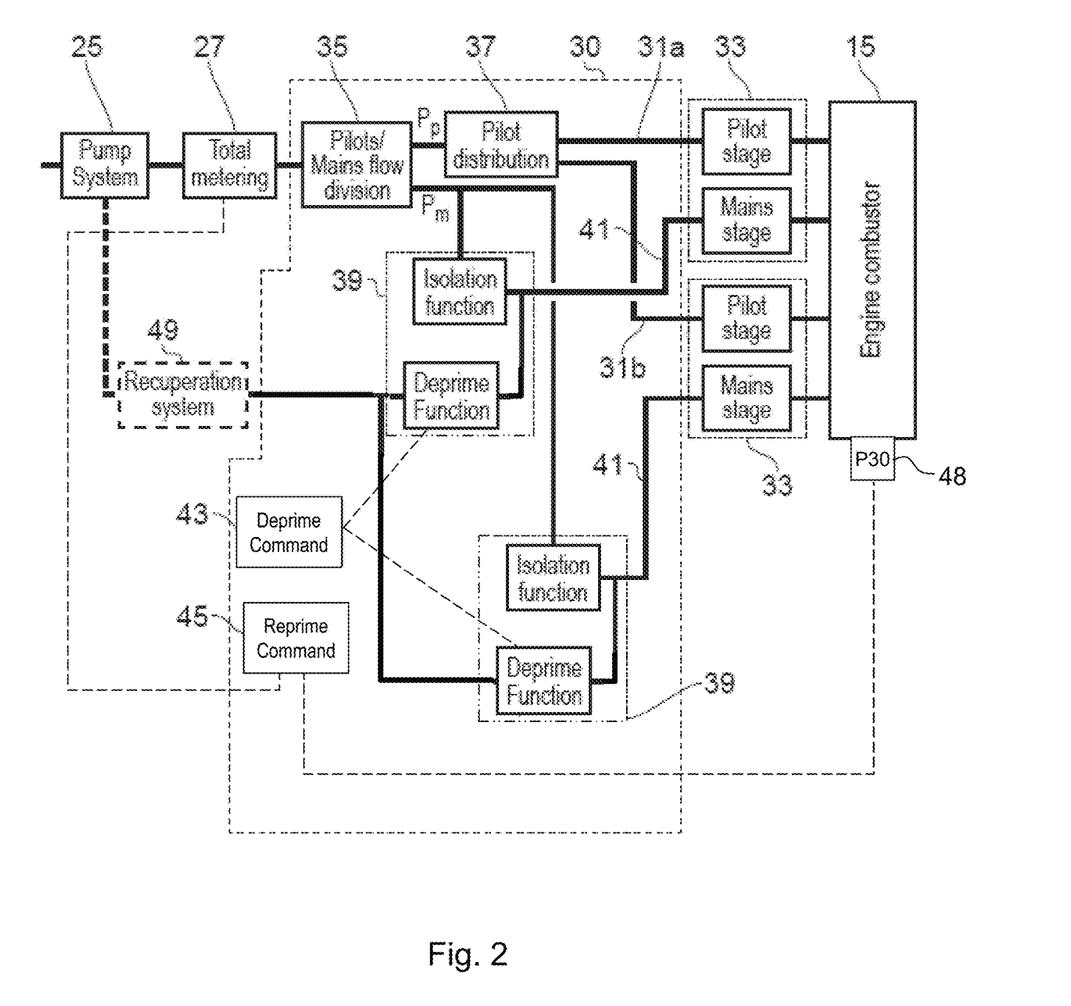
FIG. 2 shows schematically a fuel supply system for fuel injectors of a multi-stage combustor.

The combustion equipment 15 of the engine 10 includes a multi-stage combustor. FIG. 2 shows schematically a fuel supply system for fuel injectors of the multi-stage combustor. The engine has a fuel pumping system 25 comprising typically a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

The fuel supply system accepts fuel from the HP pumping stage for feeding to the combustor. This system typically has a hydro-mechanical unit (HMU) 27 which performs total metering and comprises a fuel metering valve operable to control the rate at which fuel is allowed to flow to the combustor. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane or variable stator vane actuators) that receive fuel under pressure from the HMU. Further details of such an HMU are described in EP 2339147 A (hereby incorporated by reference).

An engine electronic controller (EEC) commands the HMU fuel metering valve to supply fuel to the combustor at a given flow rate. The metered fuel flow leaves the HMU and arrives at a staging system 30.

The staging system 30 splits the fuel into two flows: one at a pressure $P_p$ for a pilot flow along pilot fuel distribution pipework to first 31a and second 31b segments of a pilot manifold and the other at a pressure $P_m$ for a mains flow along mains fuel distribution pipework. Fuel injectors 33 (only two being shown in FIG. 2) of a combustor of the engine are split into two groups. Pilot (primary) discharge orifices of the injectors of one group are connected to the first pilot manifold segment 31a, while pilot discharge orifices of the injectors of the other group are connected to the second pilot manifold segment 31b. The mains flow feeds mains (secondary) discharge orifices of the fuel injectors.

A fuel flow splitting valve (FFSV) 35, or any other suitably-arranged set of valves known to the skilled person and providing a splitting function, receives the metered fuel flow from the HMU 27. Typically, the FFSV has a slidable spool under the control of a servo-valve, the position of the spool determining the outgoing flow split between two outlets forming respectively the pilot flow and the mains flow. The spool can be positioned so that the mains stage is completely deselected, with the entire metered flow going to the pilot stage. An LVDT can provide feedback on the position of the spool to the EEC, which in turn controls staging by control of the servo-valve.

The pilot fuel distribution pipework has a distributor function 37 to split the pilot flow between the first 31a and second 31b segments of the pilot manifold. The distributor function can be a dedicated unit or can be a functional result of the operation of other parts of the staging system 30. A lean blow out protection valve and a solenoid operated control valve may be part of the distributor function 37.

The mains fuel distribution pipework splits the mains flow into sub-flows, one for each injector, or one for each of different groups of the injectors. Each sub-flow is directed to a respective isolation valve 39. In the case of each injector having a dedicated isolation valve, a respective fuel line 41 then extends from each isolation valve to its injector. In the case of each of different groups of the injectors having a dedicated isolation valve, a respective fuel line 41 extends from each isolation valve to e.g. a manifold or other distributor serving the injectors of the group. Each such group may have just two or three injectors, and these are typically neighbouring injectors in the combustor in order to reduce gravitational head effects between the injectors. However, another option for reducing gravitational head effects is for each group to be formed of two injectors which are at the same vertical height in the combustor, i.e. reflected across the vertical plane containing the engine axis.

When the mains distribution pipework is deselected for pilot-only operation, each isolation valve 39, under the control of a de-prime command function 43 of the EEC, isolates the respective fuel line 41 from the FFSV 35 and de-primes its injector/group of injectors by draining mains fuel from the injectors 33 through the fuel lines 41 to form a drained volume. The isolation valves 39 may be supplemented by one or more suitably configured pumps to assist with the draining of mains fuel. The drained fuel can be recycled by a recuperation system 49 e.g. into the pumping system 25. Each fuel line 41 can be routed vertically with its fuel injector(s) 33 at the top and its isolation valve 39 at the bottom. This helps to ensure that if the fuel line is not fully emptied, then the fuel does not egress into the fuel injector(s), causing coking of the injector nozzle(s).

The amount of fuel that is removed during de-priming is dependent on the fuel system architecture. However, enough should be removed to ensure that no fuel can egress into the injectors 33, causing coking. To this end, the amount removed preferably accounts for thermal expansion of fuel remaining in the fuel lines 41 due to heat pick up from the environment, and aircraft manoeuvres. Indeed, one option is simply to remove all the fuel in the fuel lines, although this can increase the time required for re-priming.

It should be appreciated that in some cases, particularly where the isolation valves 39 are located closer to the nozzles, the isolation valves 39 may not actively de-prime the fuel lines 41 between the isolation valves 39 and the nozzles. Nevertheless, at least a part of the volume of a fuel line 41 will typically passively drain through the associated nozzle(s) into the combustion chamber, leaving a drained volume. The amount of fuel that drains, and therefore the size of the drained volume, is typically difficult to predict.

When the mains distribution pipework is selected for pilot and mains operation, each isolation valve 39, under the control of a re-prime command function 45 of the EEC, reconnects the respective fuel line 41 with the FFSV 35 to allow a priming flow to refill the drained volume. The fuel to be used for refilling on re-priming is provided by flow from the HMU 27 and the FFSV 35. More particularly, the re-prime command function 45 controls the HMU fuel metering valve to apply a priming bias which temporarily increases the total flow from the HMU relative to the subsequent combined pilot and mains flows. This additional flow is directed by the FFSV 35 into the mains fuel distribution pipework and thence via the open isolation valves 39 into the fuel lines 41.

In parallel, a high bandwidth (dynamic) pressure sensor 48 rapidly detects the pressure (P30) rise that occurs due to the combustion of the additional priming fuel flow when it reaches the combustor. Specifically, the re-prime command function 45 can arm the pressure sensor via appropriate software to temporarily increase the frequency of its pressure detection measurements. When a P30 pressure spike is detected, the re-prime command function 45 commands the HMU fuel metering valve to remove the priming bias from the combined pilot and mains flows. Also the pressure sensor reverts to its normal frequency of pressure detection measurements. In some cases the system may conveniently leverage a pressure sensor already present in a gas turbine engine, for example a P30 sensor used in the detection of combustor rumble, to detect the pressure rise.

Figure 3:
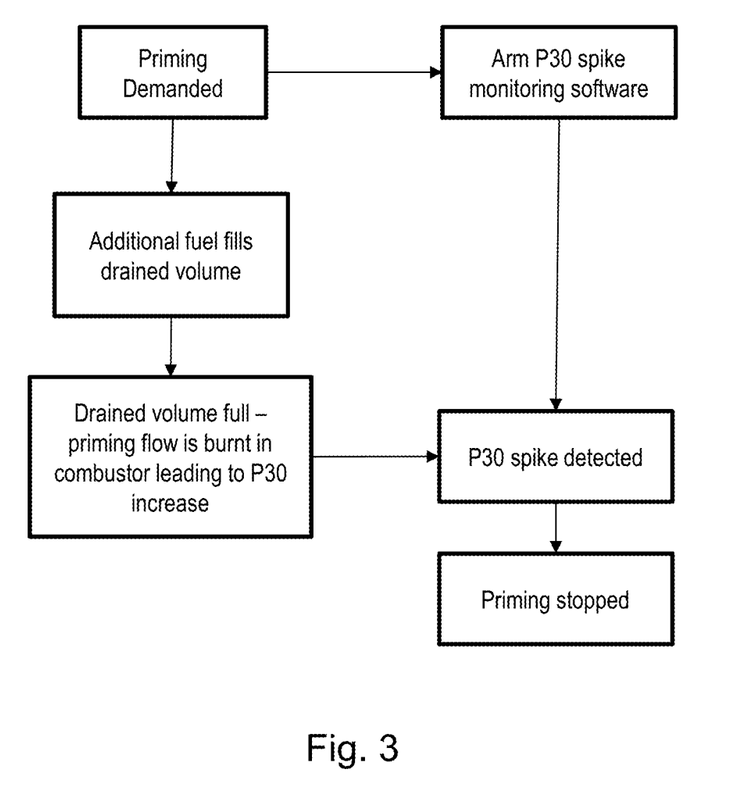
FIG. 3 is a flow chart of a closed loop control, re-prime command function.

The closed loop control provided by the re-prime command function 45 is shown schematically in FIG. 3. As long as the pressure spike duration is no more 15 ms then any effect on compressor stability is insignificant. Advantageously, this control process allows a reduction in the worst case fuel spike that has to be assumed by reducing the amount of over-fuelling that can occur during priming. This can be traded for an increase in priming boost and therefore reduced fuel dips.

In the fuel supply system of FIG. 2, the size of the priming flow (and hence the size of the drained volume) is limited by the rate at which the priming flow can be removed, which is limited by the overall dynamics of the HMU 27 and the FFSV 35. These must be able to remove the priming flow within the 15 ms typically needed to protect the compressor from the fuel spike. If this is not achievable, then alternative arrangements can be implemented.

Figure 4:
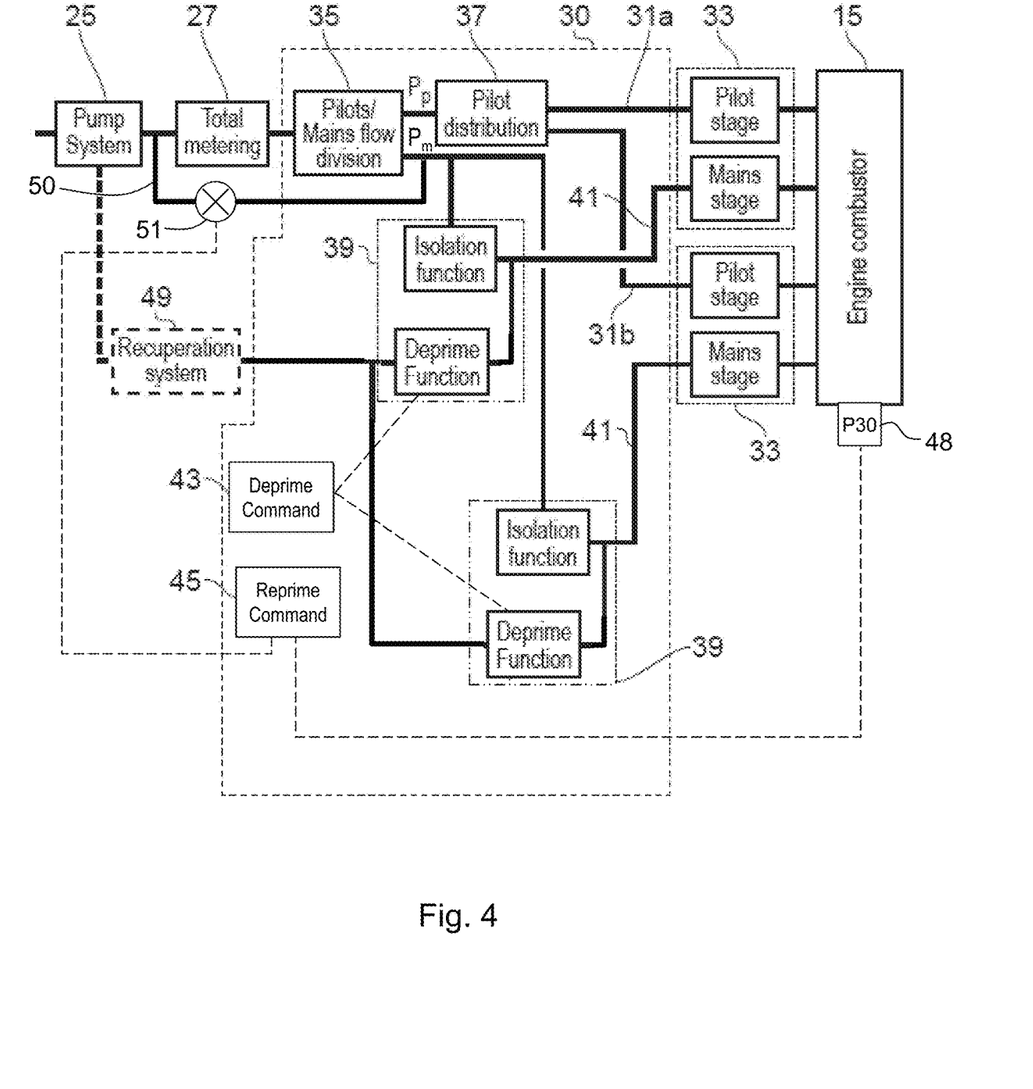
FIG. 4 shows schematically a variant fuel supply system.

One option, shown schematically in FIG. 4, is a variant fuel supply system having a bypass line 50 which bypasses the HMU 27 and the FFSV 35 to send a portion of the pressurised fuel flow directly from the HP pumping stage to the mains fuel distribution pipework, and enabling rapid shutoff of the priming flow. The bypass line includes an augmentation valve 51 which is operable by the re-prime command function 45 to open or close the bypass line.

When pilot and mains operation is selected, the augmentation valve 51 is opened, delivering pressurised fuel flow into the drained volume. The dynamic P30 sensor detects the pressure spike that occurs when the priming fuel reaches the combustor and burns, and this is used to trigger the closure of the augmentation valve, cutting off the priming flow and ending the P30 pressure spike so that compressor stability is maintained. To achieve rapid shutoff of the priming flow a fast acting augmentation valve is used. For example, this can be a direct acting solenoid driven valve (relatively simple, but lower force margin), or a dual stage servo system (more complicated, but higher force margin).

Figure 5:
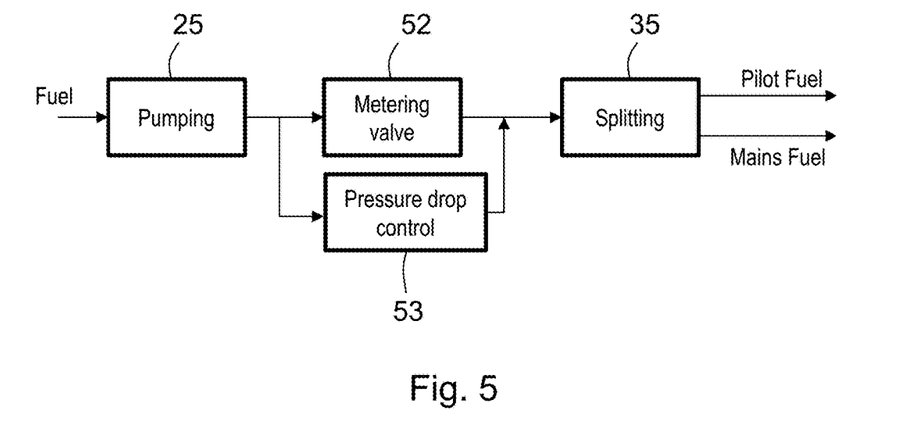
FIG. 5 shows schematically pressure drop control across a metering valve to form a priming flow in a further variant fuel supply system.

As shown schematically in FIG. 5, another option is to increase a pressure drop across the metering valve 52 of the HMU 27 to increase the metered flow therefrom. In particular, the metering valve generally has a pressure drop control arrangement 53, and changing the set-point of the pressure drop control arrangement can rapidly modify the amount of fuel passing through the metering orifice of the metering valve without regard to the overall dynamics of the HMU 27 and the FFSV 35. Conveniently, it is possible to extend the functionality of a thrust control malfunction accommodation (TCMA) valve to change the set-point for drained volume re-priming. For example, EP A 2762711 describes a TCMA valve for installation in the HMU 27 that can be adapted for this purpose. Such a valve is fast-acting because the pressure control loop has significantly faster dynamics than the metering system.

Figure 6:
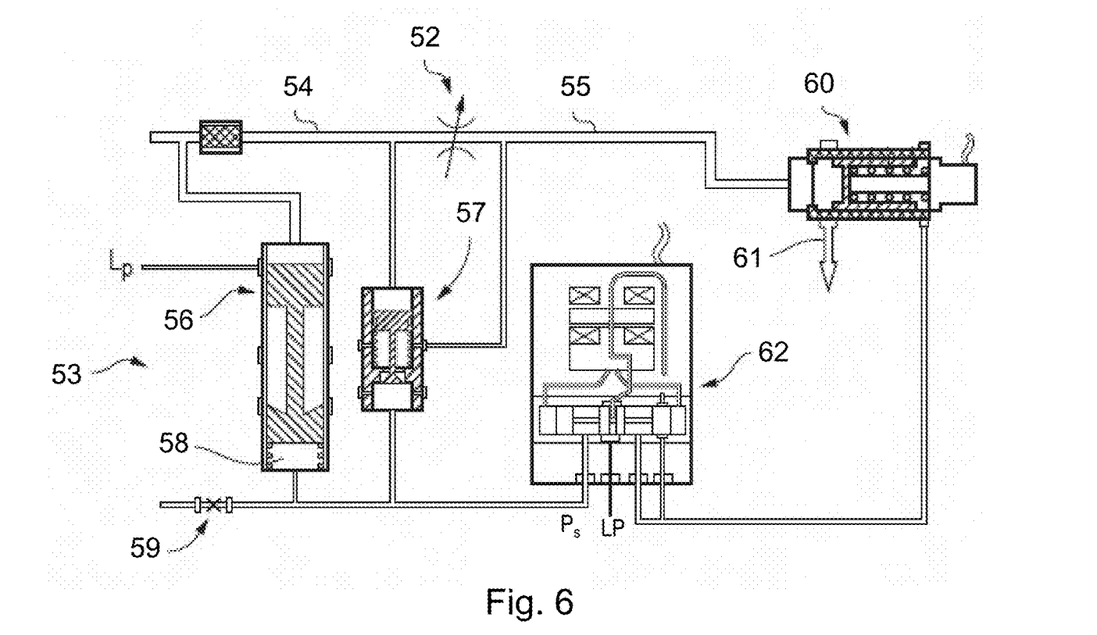
FIG. 6 shows schematically a pressure drop control arrangement of the further variant fuel supply system.

FIG. 6 shows, schematically, the pressure drop control arrangement 53. The metering valve 52 operable to control the rate at which fuel is allowed to flow from a supply line 54 to a delivery line 55. The supply line 54 is connected to the outlet of the HP pumping stage.

The pressure drop control arrangement 53 is connected to the supply line 54 and the delivery line 55 and is operable to maintain a substantially constant pressure drop across the metering valve 52. The pressure drop control arrangement 53 comprises a spill valve 56 and a pressure drop control valve 57.

The spill valve 56 is connected to the supply line 54 and is operable to allow fuel to pass from the supply line 54 to the low pressure side of the fuel pump system 25, thus altering the fuel flow through the supply line 54 and the metering valve 52. The spill valve 56 is a combining spill valve and further serves to control whether or not the output from the HP pumping stage is supplied to the supply line 54. Combining spill valves are of well known form and so the manner in which it operates to achieve this function is not described herein.

The pressure drop control valve 57 monitors the pressure drop across the metering valve 52 and controls the fuel pressure applied to a spill valve control chamber 58 of the spill valve 56 to control the operation of the spill valve 56. The manner in which the pressure drop control valve 57 operates is such that, if the pressure drop across the metering valve 52 is greater than a predetermined value, then the pressure drop control valve 57 reduces the fuel pressure within the spill valve control chamber 58. By reducing the fuel pressure within the spill valve control chamber 58, the spill valve 56 opens to allow fuel flow to be diverted from the supply line 54 to the low pressure side of the pumping system 25 at an increased rate, thereby reducing the fuel flow through, and hence the pressure drop across, the metering valve 52. If the pressure drop across the metering valve 52 becomes too small, then the operation of the pressure drop control valve 57 is such that the fuel pressure within the spill valve control chamber 58 will rise by virtue of a restricted connection 59 to high pressure. The increase in the fuel pressure within the spill valve control chamber 58 urges the spill valve 56 towards a closed position reducing the rate at which fuel flow is diverted from the supply line 54 to the low pressure side of the pumping system with the result that the fuel flow through, and hence the fuel pressure drop across, the metering valve 52 increases.

A pressure raising and shut-off valve (PRSOV) 60 is connected to the delivery line 55 and functions to ensure that the fuel pressure within the delivery line 55, is maintained at above a predetermined minimum level. The PRSOV 60 has a closed position which prevents fuel delivery from the delivery line 55 to a line 61 connected to the FFSV 35, and an open position in which such fuel flow is permitted.

Figure 7:
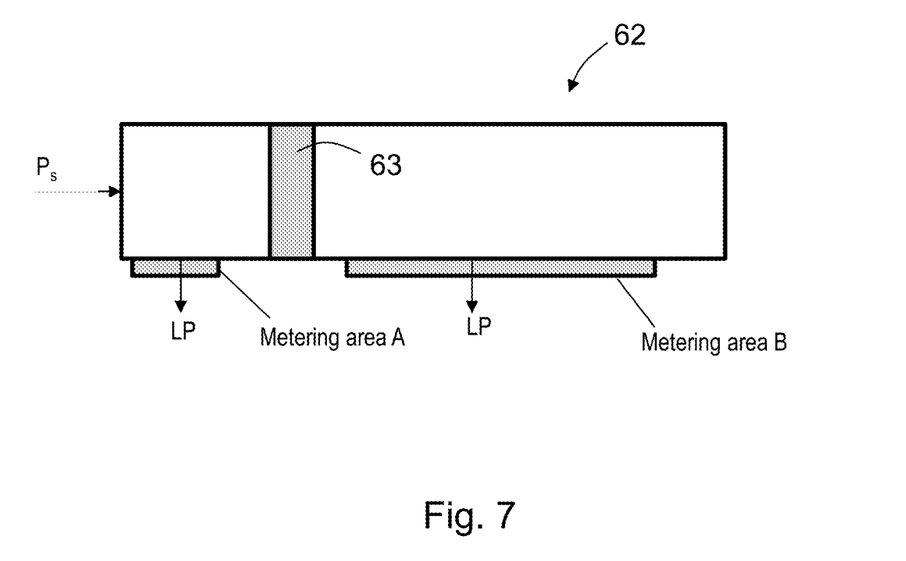
FIG. 7 shows schematically an electromagnetically operated servo valve for controlling the pressure drop control arrangement.

An electromagnetically operated servo valve 62, shown schematically in FIG. 7, is used to provide TCMA functionality, as described in EP A 2762711. However, it can also be used to change the set-point for drained volume re-priming. The valve 62 comprises a spool 63 slidable within a bore formed in a housing. The spool is configured to rest at a mid-position when not powered, which uncovers metering area A and covers metering area B, allowing $P_s$ (the setting pressure for the pressure drop control arrangement 53) to be controlled via a flow restriction to LP.

When used to produce the priming flow, the spool 63 is commanded open loop to cover metering area A, increasing the flow restriction to LP. This causes $P_s$ to rise and consequently increases the flow through the HMU 27. The dynamic P30 sensor 48 again detects the pressure spike that occurs when the priming fuel reaches the combustor, and this is used as a trigger to command the spool 63 to return to its mid-position uncovering metering area A. This rapidly cuts off the priming flow and ends the P30 pressure spike.

Use of the valve 62 to reduce $P_s$ for TCMA purposes is accomplished by moving the spool 63 in the other direction under closed loop control to expose metering area B.

The rapid priming shutoff enabled particularly by the systems of FIGS. 4 to 7 facilitates adoption of higher priming flows and therefore greater drained volumes. This allows the isolation valves 39 to be moved further away from the burner heads to locations closer to the FFSV 35, which in turn allows the number of isolation valves 39 to be reduced (potentially to one), with associated cost and weight reductions.

Moreover, if the isolation valves 39 can be moved back to a zone where stagnant fuel can be held without suffering excessive thermal degradation, this allows the removal of heat management valves and cooling loops, of the type described in EP A 3061949. As mentioned above, supplementing the isolation valves 39 with one or more suitably configured pumps to assist with the draining of mains fuel can help to prevent the holding of stagnant fuel in these areas.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

All references cited above are hereby incorporated by reference.

We claim:

1. A fuel supply system for fuel injectors of a multi-stage combustor of a gas turbine engine, the fuel supply system having:
   a metering and splitting arrangement which receives a pressurised fuel flow and controllably meters and splits the received pressurised fuel flow into metered pilot and mains fuel flows for injecting respectively at pilot and mains fuel discharge orifices of the fuel injectors to perform staging control of the multi-stage combustor;
   pilot and mains fuel distribution pipeworks respectively distributing the metered pilot and mains fuel flows from the metering and splitting arrangement to the pilot and mains fuel discharge orifices; and
   a controller which is configured to command the metering and splitting arrangement to provide the metered pilot and mains fuel flows, to select the pilot fuel distribution pipework and deselect the mains fuel distribution pipework for pilot-only operation in which there is the metered pilot fuel flow to the multi-stage combustor but no metered mains fuel flow to the multi-stage combustor from the fuel injectors, and to select both the pilot and mains fuel distribution pipeworks for pilot and mains operation in which there are the metered pilot and mains fuel flows to the multi-stage combustor from the fuel injectors;

wherein:

the fuel supply system further has a pressure sensor configured to detect pressure and provide the detected pressure to the controller;

the fuel supply system further has priming means for providing a priming fuel flow to the mains fuel distribution pipework; and the controller is further configured to command the priming means to provide the priming fuel flow to the mains fuel distribution pipework when the pilot and mains operation is initiated in order to refill, preliminary to providing the metered mains fuel flow, a volume of the mains fuel distribution pipework adjacent the mains fuel discharge orifices from which the metered mains fuel flow drains when the mains fuel distribution pipework is deselected for the pilot-only operation, and to command the priming means to stop the priming fuel flow when the detected pressure is indicative of a pressure rise caused by combustion of the priming fuel flow.

2. The fuel supply system according to claim 1, wherein the pressure rise and subsequent stopping of the priming fuel flow produces a pressure spike, the pressure sensor, the priming means and the controller being configured to stop the priming fuel flow such that the pressure spike has a duration of no more than 15 ms.

3. The fuel supply system according to claim 1, wherein the controller is configured to command the pressure sensor to increase a frequency of pressure detection by the pressure sensor when the pilot and mains operation is initiated and the priming fuel flow is provided.

4. The fuel supply system according to claim 1, which further includes one or more mains isolation valves, the mains fuel distribution pipework having fuel lines which extend from the one or more mains isolation valves to the mains fuel discharge orifices; and wherein the one or more mains isolation valves have a closed position in which, when the mains fuel distribution pipework is deselected for the pilot-only operation, the one or more mains isolation valves remove the metered mains fuel flow from the fuel injectors through the fuel lines to form a drained volume and fluidly isolate the fuel lines from the metering and splitting arrangement; and wherein the one or more mains isolation valves have an open position in which, when the mains fuel distribution pipework is selected for the pilot and mains operation, the one or more mains isolation valves fill the drained volume with the priming fuel flow and reconnect the fuel lines to the metering and splitting arrangement.

5. The fuel supply system according to claim 1, wherein the metering and splitting arrangement is the priming means.

6. The fuel supply system according to claim 5, wherein the metering and splitting arrangement includes: a fuel metering valve operable to meter the received pressurised fuel flow; and a splitting unit which controllably splits the metered pilot and mains fuel flows from the fuel metering valve and sends respective portions of the metered pilot and mains fuel flows to the pilot and mains fuel distribution pipeworks to perform staging control of the combustor.

7. The fuel supply system according to claim 6, wherein the controller is configured to command the fuel metering valve to apply a priming bias which increases a total fuel flow from the fuel metering valve relative to the subsequent combined metered pilot and mains fuel flows from the fuel metering valve, the controller removing the priming bias to stop the priming fuel flow.

8. The system according to claim 6, wherein the metering and splitting arrangement further includes a pressure drop control arrangement operable to regulate a pressure drop across the fuel metering valve, wherein the pressure drop control arrangement maintains in normal use a constant pressure drop across the fuel metering valve, and, to form the priming fuel flow, the controller is configured to command an increase in the pressure drop across the fuel metering valve to increase the metered mains fuel flow therefrom.

9. The fuel supply system according to claim 8, wherein the pressure drop control arrangement comprises a pressure drop control valve and a spill valve.

10. The fuel supply system according to claim 8, further having an electromagnetically operated servo valve which is controllable by the controller to operate the pressure drop control arrangement and thereby regulate the pressure drop across the fuel metering valve.

11. The fuel supply system according to claim 1, further having a bypass line which bypasses the metering and splitting arrangement, and an augmentation valve which is operable by the controller to open or close the bypass line, wherein the bypass line and the augmentation valve are the priming means, and to form the priming fuel flow, the controller commands the augmentation valve to open, thereby sending a portion of the pressurised fuel flow to the mains fuel distribution pipework through the bypass line.

12. A gas turbine engine having the multi-stage combustor and the fuel supply system according to claim 1, for supplying metered pilot and mains fuel flows to and performing staging control in respect of the pilot and mains fuel discharge orifices of the fuel injectors of the multi-stage combustor.

* * * * *